United States Patent
Liu et al.

(10) Patent No.: US 8,363,973 B2
(45) Date of Patent: Jan. 29, 2013

(54) DESCRIPTOR FOR IMAGE CORRESPONDING POINT MATCHING

(75) Inventors: Qiong Liu, Milpitas, CA (US); Hironori Yano, Tokyo (JP)

(73) Assignees: Fuji Xerox Co., Ltd., Tokyo (JP); FUJIFILM Corporation, Tokyo (JP)

( * ) Notice: Subject to any disclaimer, the term of this patent is extended or adjusted under 35 U.S.C. 154(b) by 736 days.

(21) Appl. No.: 12/566,580

(22) Filed: Sep. 24, 2009

(65) Prior Publication Data
US 2010/0080469 A1   Apr. 1, 2010

Related U.S. Application Data

(60) Provisional application No. 61/101,948, filed on Oct. 1, 2008.

(51) Int. Cl.
*G06K 9/00* (2006.01)

(52) U.S. Cl. .......... 382/266; 382/199

(58) Field of Classification Search .......... 382/201, 382/196
See application file for complete search history.

(56) References Cited

U.S. PATENT DOCUMENTS

| | | | |
|---|---|---|---|
| 2004/0170323 A1* | 9/2004 | Cootes et al. | 382/199 |
| 2004/0234159 A1* | 11/2004 | Wang | 382/260 |
| 2006/0159367 A1* | 7/2006 | Zeineh et al. | 382/276 |
| 2008/0069470 A1* | 3/2008 | Yu et al. | 382/266 |

OTHER PUBLICATIONS

D.G. Lowe, "Distinctive image features from scale-invariant keypoints", International Journal on Computer Vision, vol. 60, pp. 91-110, 2004.
E. Tola et al., "A Fast Local Descriptor for Dense Matching", Conference on Computer Vision and Pattern Recognition, Anchorage, AK, USA, 2008.
H. Bay et al., "SURF: Speeded Up Robust Features", Proceedings of the Ninth European Conference on Computer Vision, May 2006.
D.M. Mount, "ANN Programming Manual", http://www.cs.umd.edu/~mount/ANN/Files/1.1.1/ANNmanual_1.1.1.pdf, 2006.
S. Arya et al., "Approximate nearest neighbor queries in fixed dimensions", In Proc. 4th ACM-SIAM Sympos. Discrete Algorithms, pp. 271-280, 1993.
J. Matas et al., "Robust wide baseline stereo from maximally stable external regions",In BMVC, pp. 384-393, 2002.
S. Se et al., "Vision based modeling and localization for planetary exploration rovers", Proceedings of International Astronautical Congress, 2004.
T. Tuytelaars et al., "Wide baseline stereo based on local, affinely invariant regions", In BMVC, pp. 412-422, 2000.
K. Mikolajczyk et al., "A performance evaluation of local descriptors", In CVPR, vol. 2, pp. 257-263, Jun. 2003.
K. Mikolajczyk et al., "A performance evaluation of local descriptors", PAMI, 27(10): 1615-1630, 2005.
K. Mikolajczyk et al., "A comparison of affine region detectors", IJCV, 65(1/2); 43-72, 2005.

\* cited by examiner

*Primary Examiner* — Hadi Akhavannik
(74) *Attorney, Agent, or Firm* — Sughrue Mion, PLLC

(57) ABSTRACT

System and method of generating feature descriptors for image identification. Input image is Gaussian-blurred at different scales. A difference of Gaussian space is obtained from differences of adjacent Gaussian-blurred images. Key points are identified in the difference-of-Gaussian space. For each key point, primary sampling points are defined with three dimensional relative positions from key point and reaching into planes of different scales. Secondary sampling points are identified for each primary sampling point. Secondary image gradients are obtained between an image at a primary sampling point and images at secondary sampling points corresponding to this primary sampling point. Secondary image gradients form components of primary image gradients at primary sampling points. Primary image gradients are concatenated to obtain a descriptor vector for input image. Descriptor vector thus obtained is scale invariant and requires a number of additions equal to number of primary sampling points multiplied by a number of secondary sampling points.

24 Claims, 9 Drawing Sheets

Construction of the SIFT descriptor construction of FIT descriptor

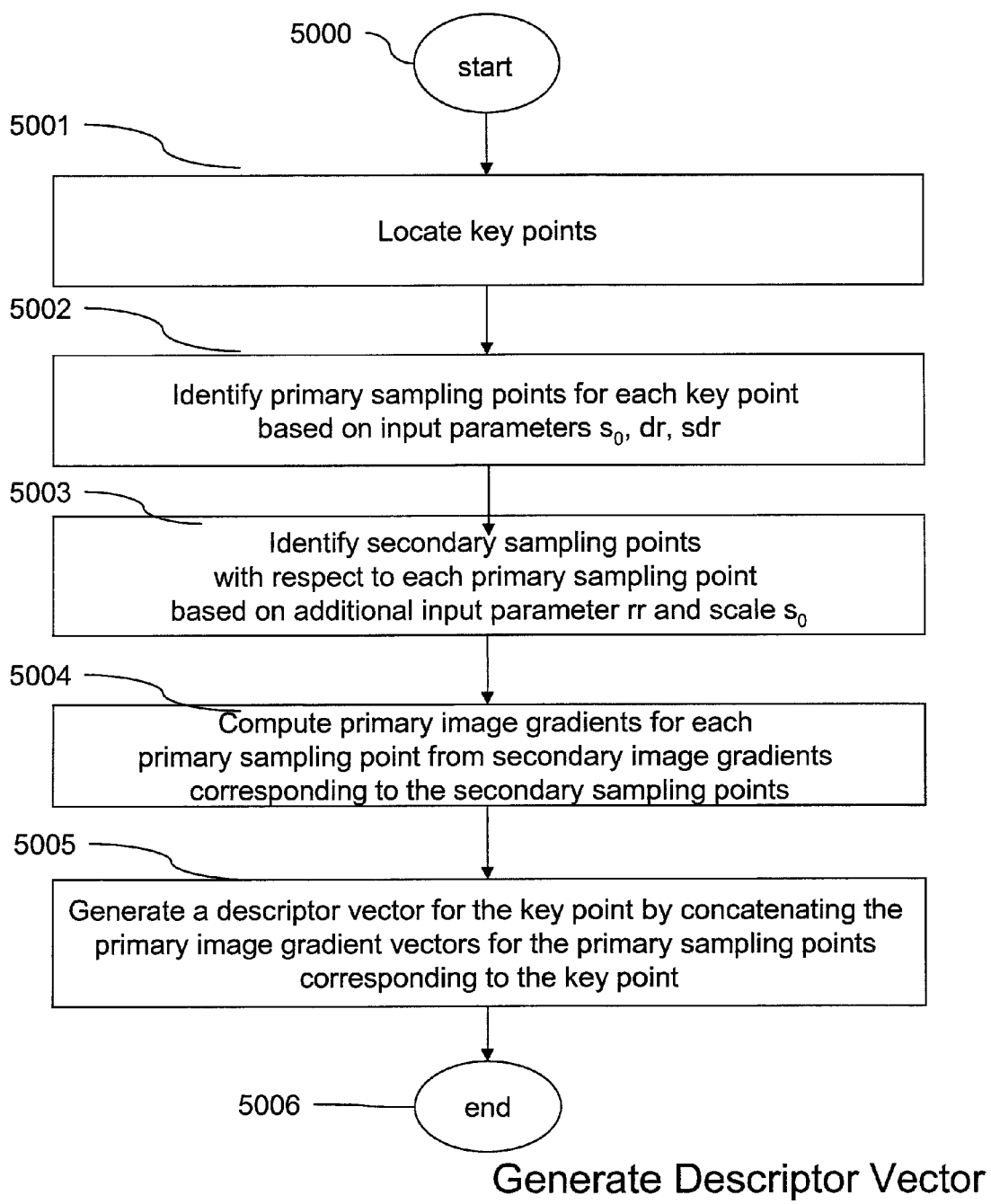

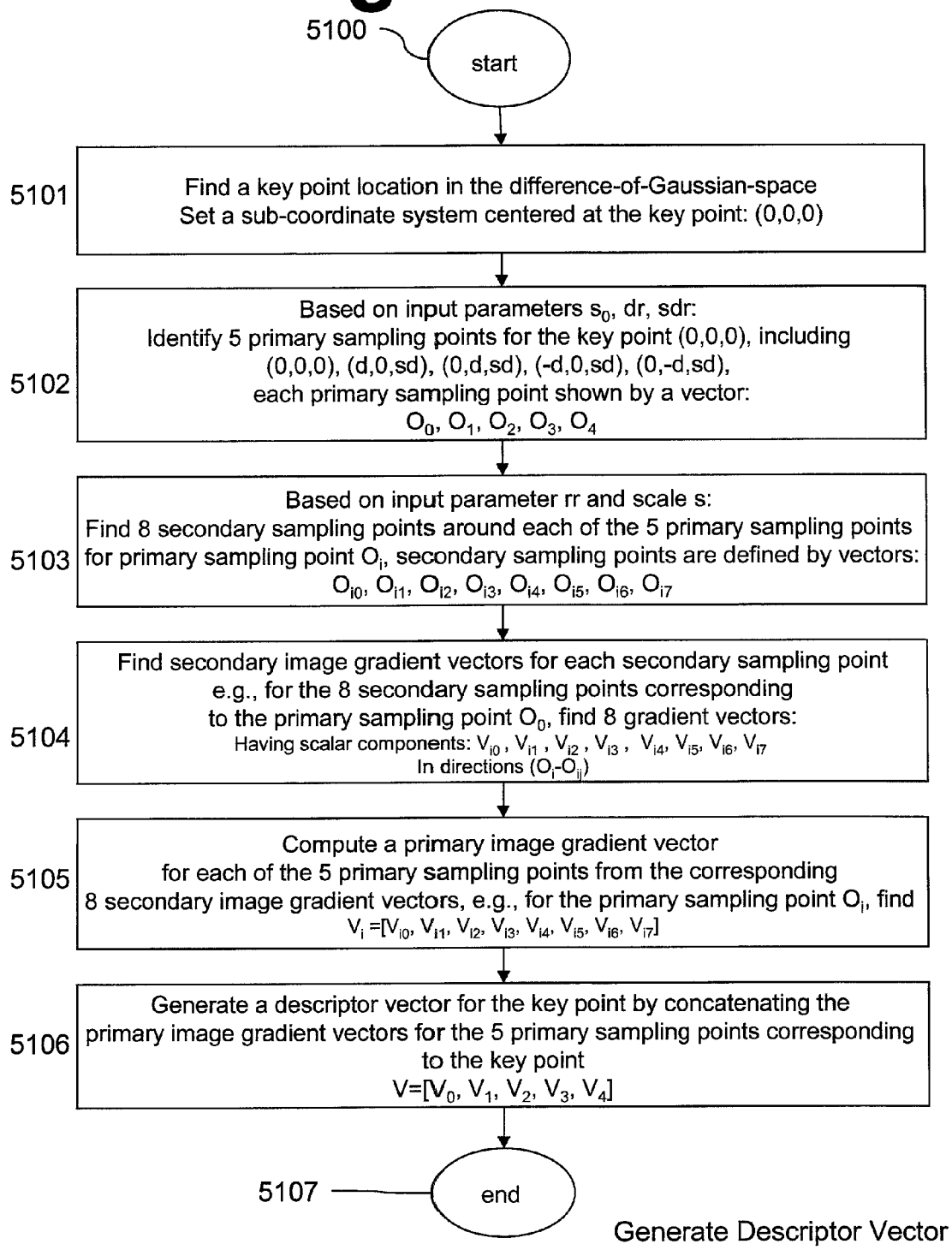

sub-coordinate system of primary sampling points

DESCRIPTOR FOR IMAGE CORRESPONDING POINT MATCHING

CROSS-REFERENCE TO RELATED APPLICATION

This application claims the benefit of priority of the U.S. Provisional Application No. 61/101,948, filed in the United States Patent and Trademark Office on Oct. 1, 2008, the entire content of which is incorporated by this reference.

FIELD OF THE INVENTION

This invention generally relates to the field of computer vision and, more particularly, to detection and description of local features in images using feature descriptor vectors that are scale and rotation invariant and may also be invariant to other factors including image location and illumination.

BACKGROUND OF THE INVENTION

Finding point correspondences among images of the same object is important for image retrieval, object recognition, scene identification, and 3D shape estimation. Points of interest in an image for the purpose of image retrieval, object recognition and the like are called key points. The key points have to be selected and processed such that they are invariant to image scale and rotation and provide robust matching across a substantial range of distortions, change in 3D viewpoint, noise and change in illumination. Further, in order to be well suited for tasks such as image retrieval and object recognition, the key points have to be distinctive in the sense that a single feature can be correctly matched with high probability against a large database of features from many images.

After, the points of interest, or key points, are detected and located, they are described using various descriptors. Then, the individual features corresponding to the key points and represented by the descriptors are matched to a database of features from known objects. Therefore, a correspondence searching system can be separated into three modules: interest point detector, image point descriptor, and correspondence locator. In these three modules, the descriptor's construction complexity and dimensionality have direct and significant impact on the performance of the system as a whole (e.g. the SIFT descriptor construction costs about ¾ of the total feature extraction time). The discussion that follows focuses on a method for developing a descriptor vector of a keypoint neighborhood.

Several image point descriptors have been proposed in the literature. Scale-invariant feature transform (SIFT) is one type of algorithm used in computer vision for detecting and describing local features in the images. Speeded-up robust features (SURF) is another type of algorithm used for detecting and describing local features in images. Applications of SIFT and SURF include object recognition and 3D reconstruction. The literature also includes comparisons and evaluations of these image point descriptors. According to these comparisons, SIFT and SURF provide similar distinctiveness while SURF is faster in speed and SIFT has fewer damaging artifacts for wide base line image matching. For SIFT, distinctiveness of descriptors is measured by summing the eigenvalues of the descriptors. The sum corresponds to the amount of variance captured by different descriptors, therefore, to their distinctiveness.

FIG. 1 shows a flowchart of a method for constructing a SIFT descriptor.

This flow chart summarizes the SIFT feature computation. The method begins at 1000. At 1001, an input image is received.

At 1002, the input image is gradually Gaussian-blurred to construct a Gaussian pyramid. Gaussian blurring generally involves convolving the original image $I(x, y)$ with the Gaussian blur function $G(x, y, k_i \sigma)$ at scale $k_i \sigma$ such that the Gaussian blurred function $L(x, y, k_i \sigma)$ is defined as $L(x, y, k_i \sigma) = G(x, y, k_i \sigma) * I(x, y)$. Here, $k_i \sigma$ denotes the standard deviation of the Gaussian function that is used for blurring the image. As $k_i$ is varied, the standard deviation $k_i \sigma$ varies and a gradual blurring is obtained. The standard deviation of the first blur function is denoted with $\sigma$ and $k_i$ are multipliers that change the standard deviation. When the initial image I is incrementally convolved with Gaussians G to produces the blurred images, the blurred images L are separated by a constant factor $k_i$ in the scale space.

At 1003, a difference of Gaussian (DoG) pyramid is constructed by computing the difference of any two consecutive Gaussian-blurred images in the Gaussian pyramid. Thus, in the DoG space, $D(x, y, \sigma) = L(x, y, k_i \sigma) - L(x, y, (k_i-1)\sigma)$. A DoG image $D(x, y, \sigma)$ is the difference between the Gaussian-blurred images at scales $k_i \sigma$ and $(k_i-1)\sigma$. The scale of the $D(x, y, \sigma)$ lies somewhere between $k_i \sigma$ and $(k_i-1)\sigma$ and as the number of Gaussian-blurred images increase and the approximation provided for the Gaussian pyramid approaches a continuous space, the two scales also approach into one scale. The convolved images L are grouped by octave where an octave corresponds to a doubling of the value of the standard deviation, $\sigma$. Moreover, the values of the multipliers $k_i$ are selected such that a fixed number of convolved images L are obtained per octave. Then, the DoG images D are obtained from adjacent Gaussian-blurred images L per octave. After each octave, the Gaussian image is down-sampled by a factor of 2 and then the process is repeated.

At 1004, local maxima and local minima in the DoG space are found and the locations of these maxima and minima are used as key-point locations in the DoG space. Finding the local maxima and minima is achieved by comparing each pixel in the DoG images D to its eight neighbors at the same scale and to the nine neighboring pixels in each of the neighboring scales on the two sides, for a total of 26 pixels (9×2+8=26). If the pixel value is a maximum or a minimum among all 26 compared pixels, then it is selected as a key point. After this stage, the key points may be further processed such that their location is identified more accurately and some of the key points, such as the low contrast key points and edge key points may be discarded.

At 1005, each key point is assigned one or more orientations, or directions, based on the directions of the local image gradient. By assigning a consistent orientation to each key point based on local image properties, the key point descriptor can be represented relative to this orientation and therefore achieve invariance to image rotation. The magnitude and direction calculations are performed for every pixel in the neighboring region around the key point in the Gaussian-blurred image L and at the key-point scale. The magnitude of the gradient for a key point located at $(x, y)$ is shown as $m(x, y)$ and the orientation or direction of the gradient for the key point at $(x, y)$ is shown as $Theta(x, y)$. The scale of the key point is used to select the Gaussian smoothed image, L, with the closest scale to the scale of the key point, so that all computations are performed in a scale-invariant manner. For each image sample, $L(x, y)$, at this scale, the gradient magnitude, $m(x, y)$, and orientation, $Theta(x, y)$, are computed using pixel differences according to: $m(x, y) = SQRTR[(L(x+1, y) - L(x-1, y))^2 + (L(x, y+1) - L(x, y-1))^2]$. The direction Theta(x, y) is calculated as Theta(x, y)=arctan [(L(x, y+1)−L(x, y−1))/(L(x+1, y)−L(x−1,y))]. Here, L(x, y) is a sample of the Gaussian-blurred image L(x, y, σ), at scale σ which is also the scale of the key point.

In practice, the gradients are calculated consistently either for the plane in the Gaussian pyramid that lies above, at a higher scale, than the plane of the key point in the DoG space or in a plane of the Gaussian pyramid that lies below, at a lower scale, than the key point. Either way, for each key point, the gradients are calculated all at one same scale in a rectangular area surrounding the key point. Moreover, the frequency of an image signal is reflected in the scale of the Gaussian-blurred image. Yet, SIFT simply uses gradient values at all pixels in the rectangular area. A rectangular block is defined around the key point; sub-blocks are defined within the block; samples are defined within the sub-blocks and this structure remains the same for all key points even when the scales of the key points are different. Therefore, while the frequency of an image signal changes with successive application of Gaussian smoothing filters in the same octave, the key points identified at different scales are sampled with the same number of samples irrespective of the change in the frequency of the image signal, which is represented by the scale.

At 1006, the distribution of the Gaussian-weighted gradients are computed for each block where each block is 2 sub-blocks by 2 sub-blocks for a total of 4 sub-blocks (In practice, SIFT has to use 4 sub-blocks by 4 sub-blocks for a total of 16 sub-blocks to achieve desired distinctiveness). To compute the distribution of the Gaussian-weighted gradients, an orientation histogram with several bins is formed with each bin covering a part of the area around the key point. The orientation histogram may have 36 bins each covering 10 degrees of the 360 degree range of orientations. Alternatively, the histogram may have 8 bins each covering 45 degrees of the 360 degree range.

Each sample added to the histogram is weighted by its gradient magnitude within a Gaussian-weighted circular window with a standard deviation that is 1.5 times the scale of the key point. Peaks in the orientation histogram correspond to dominant directions of local gradients. The highest peak in the histogram is detected and then any other local peak that is within a certain percentage, such as 80%, of the highest peak is used to also create a key point with that orientation. Therefore, for locations with multiple peaks of similar magnitude, there will be multiple key points created at the same location and scale but different orientations.

At 1007, the histograms from the sub-blocks are concatenated to obtain a feature descriptor vector for the key point. If the gradients in 8-bin histograms from 16 sub-blocks are used, a 128 dimensional feature descriptor vector results. At 1008, the method ends.

In one example, the feature descriptor is computed as a set of orientation histograms on (4×4) blocks in the neighborhood of the key point. Histograms contain 8 bins each, and each descriptor contains a 4×4=16 array of 8-bin histograms around the key point. This leads to a SIFT feature vector with (4×4)×8=128 elements. This vector is normalized to enhance invariance to changes in illumination.

The dimension of the descriptor, i.e. 128, in SIFT is high. However, descriptors with lower dimensions have not performed as well across the range of matching tasks. Longer descriptors continue to perform better but not by much and there is an additional danger of increased sensitivity to distortion and occlusion.

FIG. 2 shows a schematic depiction of constructing a SIFT descriptor.

The steps of the flowchart of FIG. 1 are shown schematically in FIG. 2. For example, the blurring of the image to construct a Gaussian pyramid (1002) and the differencing (1003) is shown in the top left corner, proceeding to computing key points by locating of the local maxima and minima (1004) on top right corner. The calculation of the gradient vectors (1005) is shown in the bottom left corner. The computation of the gradient distribution (1006) in histograms is shown in the bottom right corner. Finally the feature descriptor vector that is a concatenation (1007) of the histograms is also shown in the bottom right corner.

In FIG. 2, the key point 200 is located at a center of the rectangular block 202 that surrounds the key point 200.

The gradients that are pre-computed for each level of the pyramid are shown as small arrows at each sample location 206 at the bottom left (1005). As shown, 4×4 regions of samples 206 form a sub-block 204 and 2×2 regions of sub-blocks form the block 202. The block 202 is also called a descriptor window. The Gaussian weighting function is shown with the circle 220 and is used to assign a weight to the magnitude of each sample point 206. The weight in the circular window 220 falls off smoothly. The purpose of the Gaussian window 220 is to avoid sudden changes in the descriptor with small changes in position of the window and to give less emphasis to gradients that are far from the center of the descriptor. A 2×2=4 array of orientation histograms is obtained from the 2×2 sub-blocks with 8 orientations in each bin of the histogram resulting in a (2×2)×8=32 dimensional feature descriptor vector. However, other studies have shown that using a 4×4 array of histograms with 8 orientations in each histogram (8-bin histograms), resulting in a (4×4)×8=128 dimensional feature descriptor vector for each key point yields a better result.

The feature descriptor vector may be subsequently further modified to achieve invariance to other variables such as illumination.

SUMMARY OF THE INVENTION

The inventive methodology is directed to methods and systems that substantially obviate one or more of the above and other problems associated with conventional techniques for generating a feature descriptor.

Aspects of the present invention provide a descriptor that can be computed faster than SIFT while it does not lose the advantage of SIFT over SURF. In accordance with one aspect of the invention, an image point descriptor is designed that has a comparable distinctiveness with state-of-the-art descriptors and significantly reduced computational complexity and dimensionality.

Aspects of the present invention provide a method for generating a feature descriptor vector for image identification. The method is being implemented in a computing system having components including an input and output interface, a storage medium, one or more processors, and a link providing communication between the components. The method involves receiving an input image at the input and output interface; constructing a Gaussian pyramid space of the input image by applying Gaussian-blur filters to the input image and generating Gaussian-blurred images, the Gaussian-blur filters each having a different scale of blurring, the scales being based on input parameters; locating key points in the Gaussian pyramid space; identifying primary sampling points for each of the key points in the Gaussian pyramid space, the primary sampling points being defined with three dimensional relative positions from the key point; calculating primary image gradients corresponding to the primary sampling points, the primary image gradients being vectors indicating a change in image in a vicinity of the primary sampling points; and generating a feature descriptor vector for the input image by concatenating the primary image gradients.

Aspects of the present invention provide a computer system for generating a feature descriptor vector for image identification. The inventive system includes: an input and output interface for receiving an input image; and one or more processors for constructing a Gaussian pyramid space of the input image by applying Gaussian-blur filters to the input image and generating Gaussian-blurred images, the Gaussian-blur filters each having a different scale of blurring, the scales being based on input parameters. In the inventive system, the one or more processors locate key points in the Gaussian pyramid space, identify primary sampling points for each of the key points in the Gaussian pyramid space, the primary sampling points being defined with three dimensional relative positions from the key point, calculate primary image gradients corresponding to the primary sampling points, the primary image gradients being vectors indicating a change in image in a vicinity of the primary sampling points, and generate a feature descriptor vector for the input image by concatenating the primary image gradients. In the inventive system, the input and output interface provides the feature descriptor vector to a user through the input and output interface.

Aspects of the present invention provide a computer readable medium embodying a set of instructions, which, when executed by one or more processors cause the one or more processors of a computer system to perform a method for generating a feature descriptor vector for image identification. The inventive computer system incorporates components including an input and output interface, a storage medium, one or more processors, and a link providing communication between the components. The inventive method involves: receiving an input image at the input and output interface; constructing a Gaussian pyramid space of the input image by applying Gaussian-blur filters to the input image and generating Gaussian-blurred images, the Gaussian-blur filters each having a different scale of blurring, the scales being based on input parameters; locating key points in the Gaussian pyramid space; identifying primary sampling points for each of the key points in the Gaussian pyramid space, the primary sampling points being defined with three dimensional relative positions from the key point; calculating primary image gradients corresponding to the primary sampling points, the primary image gradients being vectors indicating a change in image in a vicinity of the primary sampling points; and generating a feature descriptor vector for the input image by concatenating the primary image gradients.

It is to be understood that both the foregoing and the following descriptions are exemplary and explanatory only and are not intended to limit the claimed invention or its application.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 5A shows a flowchart of a method for constructing image descriptors, according to aspects of the present invention.

FIG. 5B shows a flowchart of a particular example of the method for constructing image descriptors shown in FIG. 5A, according to aspects of the present invention.

DETAILED DESCRIPTION

Figure 1:
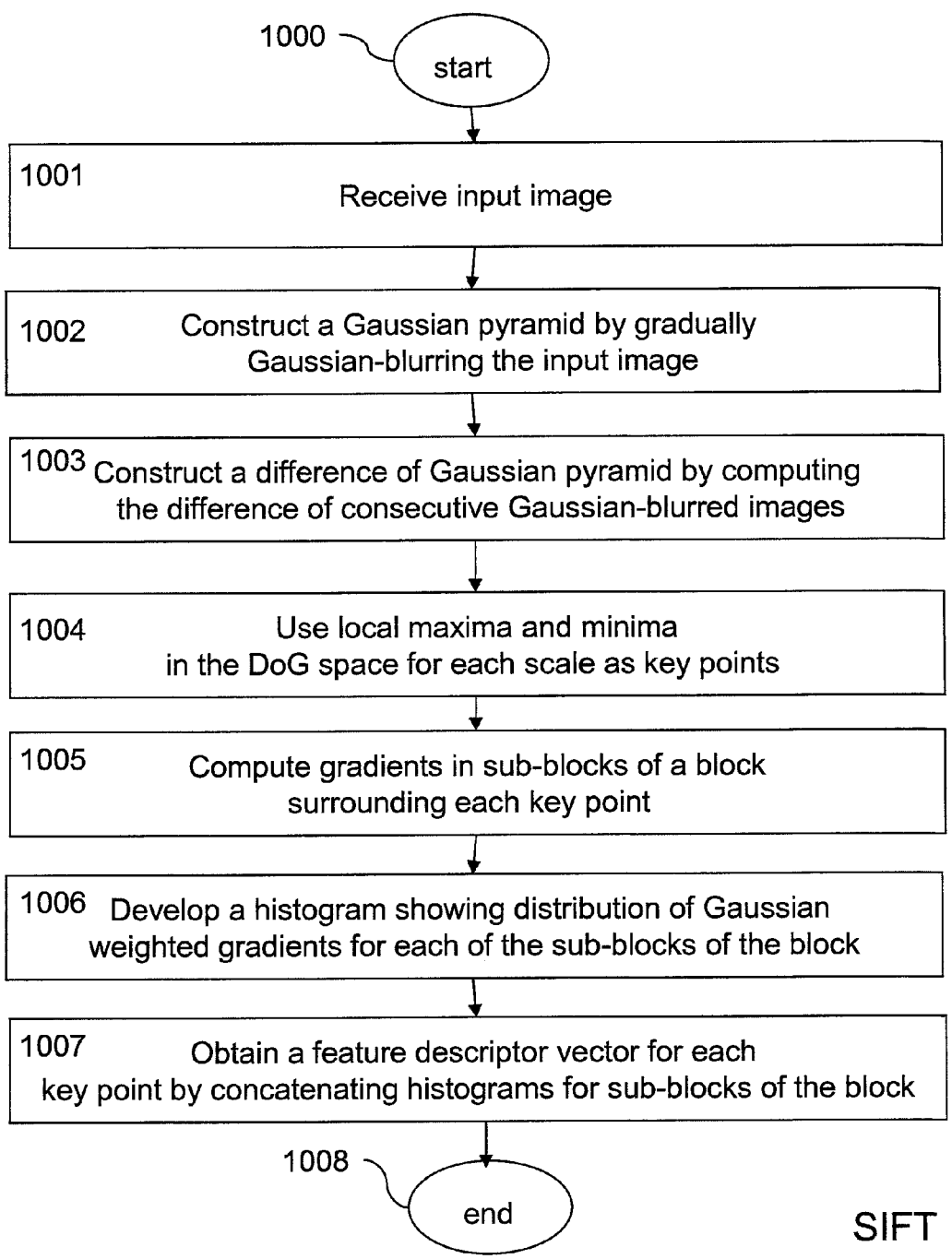
FIG. 1 shows a flowchart of a method for constructing a SIFT descriptor.

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Aspects of the present invention are directed to generating a novel image descriptor designed for matching corresponding points in document images or traditional photos. A method for constructing the new feature set according to the aspects of the present invention is being referred to in the written description of the current specification as fast invariant transform (FIT).

Aspects of the present invention provide an image descriptor that can be computed much faster (currently, about 4 times faster for total feature extraction and about 70 times faster for descriptor construction only) than the image descriptor provided by SIFT. Aspects of the present invention directly compute scale-dependent gradients at multiple coarse scales higher than the key point scale. This is different from SIFT where all local gradients are computed at the key point scale. Further, in the aspects of the present invention, the time consuming gradient weighting process of SIFT is eliminated. Instead, the data generated in the Gaussian pyramid is used directly. SIFT, on the other hand applies a Gaussian weighting function to the computed local gradients after the gradients have been calculated thus adding an extra computational step.

Several examples illustrate the difference between the results obtained from FIT and the results obtained from SIFT. SIFT provides a 128 dimensional descriptor vector that collects information at one scale level. In contrast, FIT provides a 40 dimensional descriptor vector, for example, that collects information at multiple scales. This design provides more freedom to shrink the descriptor dimension as well as the descriptor occupied spatial region. By comparing the 40-dimensional descriptor of the aspects of the present invention with a 128-dimensional SIFT descriptor on 1000 pages of the international conference on multimedia expo 2006 (ICME06) papers, SIFT achieved 99.93% page recognition rate while the approach of the aspects of the present invention achieved 99.9% page recognition rate. These two recognition rates are comparable while the approach of the aspects of the present invention is significantly faster than SIFT in descriptor construction and later search.

Further, compared to the 128 dimensional descriptor vector of SIFT, because the descriptor has only 40 dimensions in this example, the descriptor of FIT uses approximately ⅓ of the storage space required for the SIFT descriptor. This savings in storage space is important when a large amount of data are being searched and indexed. The space and computation requirements of the aspects of the invention can be also 50% lower than the requirements for the SURF descriptor, despite these recognition rates are compatible.

By comparing the search speeds of the SIFT descriptor and the FIT descriptor on a 1000-page paper search with the same approximate nearest neighbor (ANN) algorithm, the algorithm that uses the FIT descriptor is about 9.17 times faster. The speed is expected to increase for a search of a larger dataset. Further, the FIT algorithm can be much faster than the digital accessible information system (DAISY) descriptor for wide baseline image matching. In theory, the FIT descriptor will not have the damaging artifacts that SURF produces for wide baseline image matching.

Figure 3:
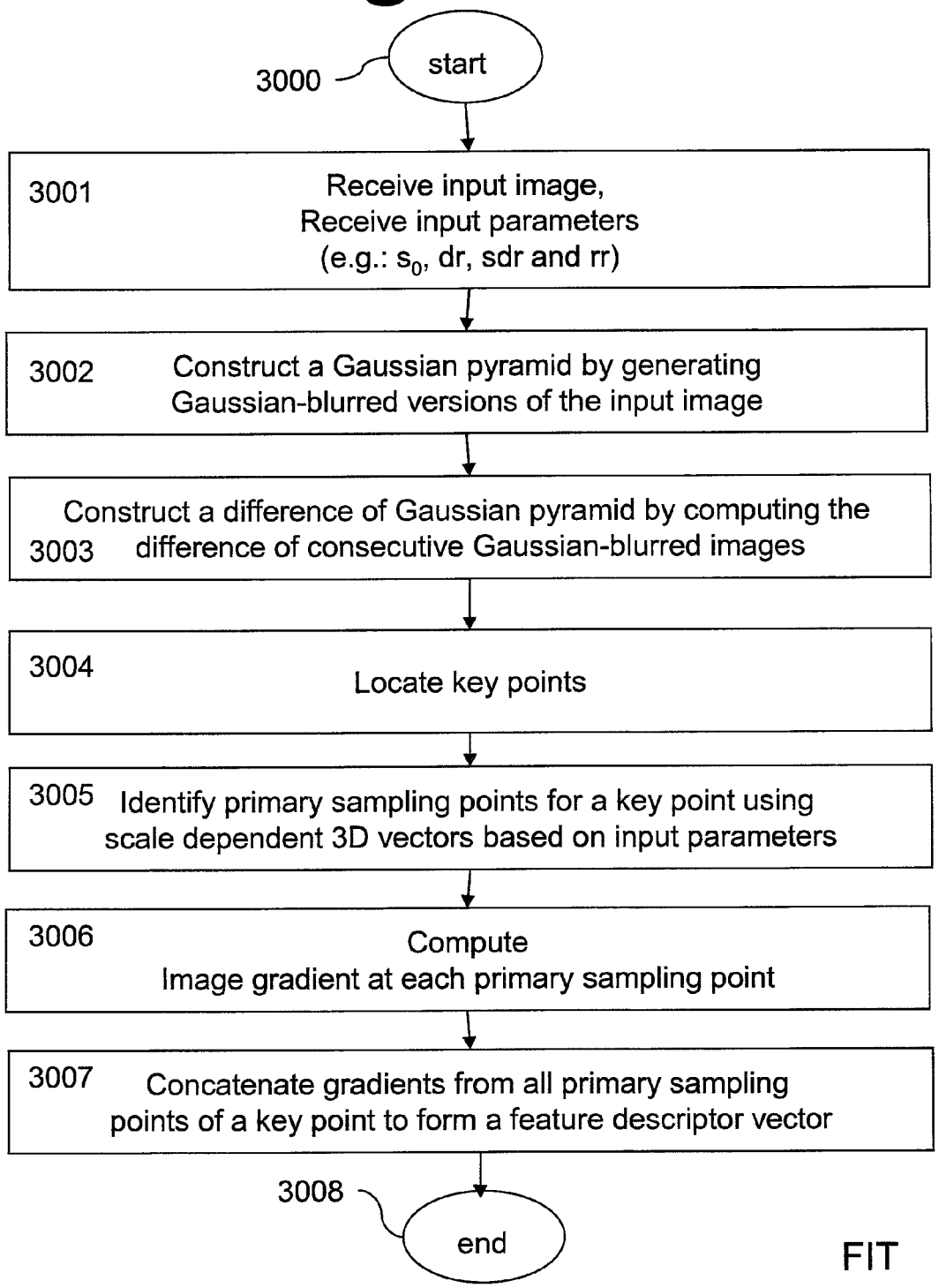
FIG. 3 shows a flowchart of a method for performing a fast invariant transform (FIT) computation for constructing a new feature set, according to aspects of the present invention.

FIG. 3 shows a flowchart of a method for performing a fast invariant transform (FIT) computation for constructing a new feature set, according to aspects of the present invention.

An exemplary FIT feature construction process in accordance with a feature of the inventive concept begins at 3000. At 3001, an input image is received. Other input parameters may also be received at this stage or later. At 3002, the input image is gradually Gaussian-blurred to construct a Gaussian pyramid. At 3003, a DoG pyramid is constructed by computing the difference between any two consecutive Gaussian-blurred images in the Gaussian pyramid. At 3004, key points are selected. In one example, the local maxima and the local minima in the DoG space are determined and the locations and scales of these maxima and minima are used as key point locations in the DoG space and the Gaussian pyramid space. Up to this point the FIT process may be conducted similarly to the SIFT process of FIG. 1.

At 3005, descriptor sampling points called primary sampling points are identified based on each key point location in the Gaussian pyramid space. The term primary sampling point is used to differentiate these descriptor sampling points from points that will be referred to as secondary sampling points. Several secondary sampling points pertain to each of the primary sampling points as further described with respect to FIG. 5A below. The relation between each primary sampling point and its corresponding key point is defined by a 3D vector in the spatial-scale space. More specifically, scale dependent 3D vectors starting from a key point and ending at corresponding primary sampling points are used to identify the primary sampling points for the key point.

At 3006, scale-dependant gradients at each primary sampling point are computed. These gradients are obtained based on the difference in image intensity between the primary sampling point and each of its associated secondary sampling points. If the difference in image intensity is negative, indicating that the intensity at the secondary sampling point is higher than the intensity at the primary sampling point, then the difference is set to zero.

At 3007, the gradients from all primary sampling points of a key point are concatenated to form a vector as a feature descriptor.

At 3008, the process ends.

The FIT shown in the flowchart of FIG. 3 is faster than the SIFT process shown in FIG. 1, and the reasons why are explored in this paragraph. For each 128-dimensional SIFT descriptor, a block of 4 sub-blocks by 4 sub-blocks is used around the key point, where each sub-block in turn includes at least a 4 pixel by 4 pixel area for a total of 16 pixel by 16 pixels. Therefore, the gradient values need to be computed at 16×16=256 pixels or samples around the key point. Further, it is common practice for each sub-block to include an area of more than 4 pixels by 4 pixels. When each sub-block includes an area with more than 4 by 4 pixels, the algorithm has to compute gradients at even a greater number of points. The gradient is a vector and has both a magnitude and a direction or orientation. To compute the gradient magnitude, m(x, y), and orientation, Theta (x, y), at each pixel, the method needs to conduct 5 additions, 2 multiplications, 1 division, 1 square root, and 1 arc tangent computation. The method also needs to weigh these 256 gradient values with a 16×16 Gaussian window. If gradient values are to be computed accurately for each point, SIFT also needs to do interpolations in scale space. Because of computation cost concerns, the gradient estimations at the right scale are generally very crude in SIFT implementations.

Aspects of the present invention as reflected in the process of FIT, on the other hand, require 40 additions as the basic operations in this example. Since the cost is relatively small for interpolating 40 gradient values, scale space interpolations are used to make the gradient estimation more accurate.

Figure 4:
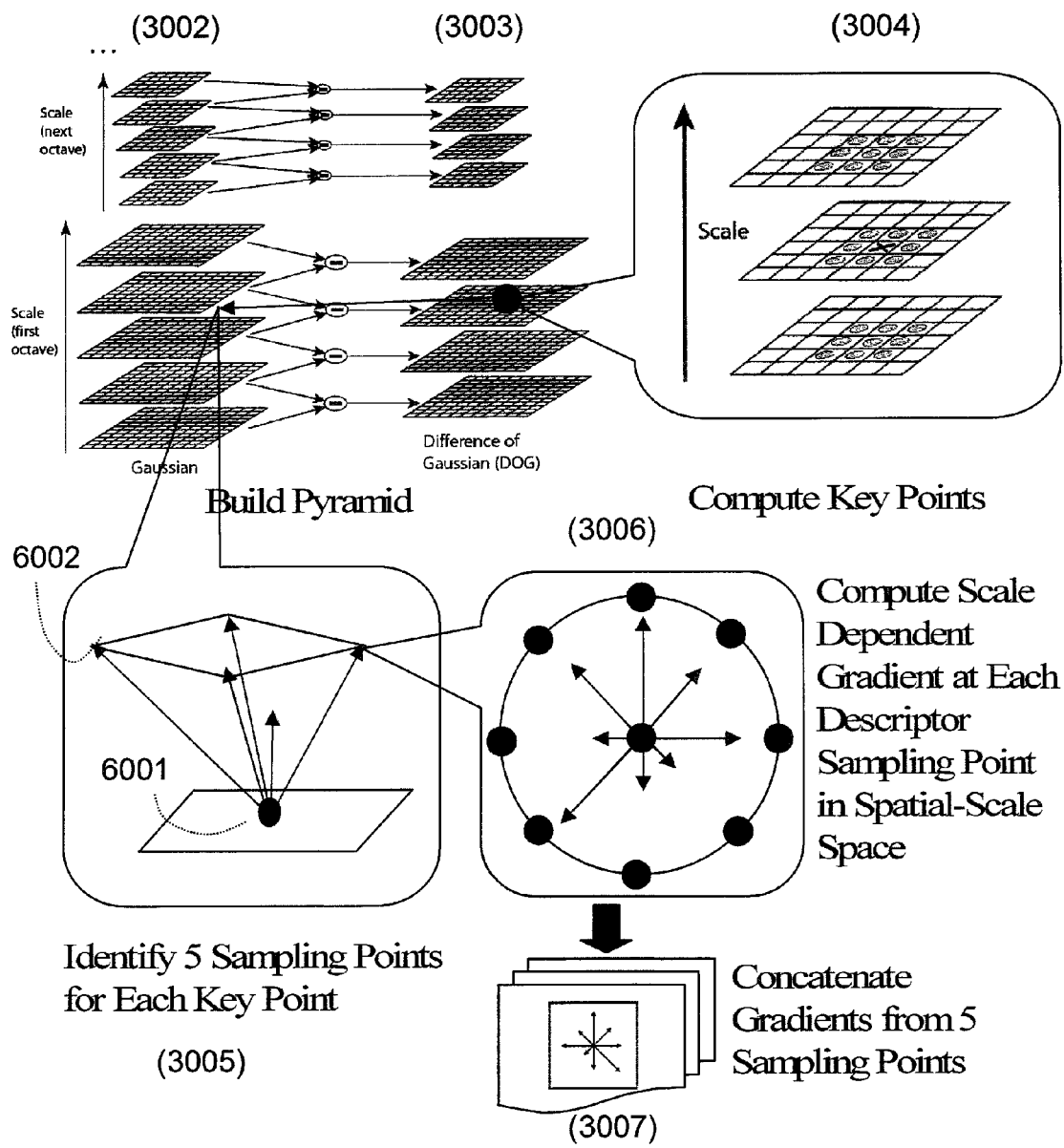
FIG. 4 shows a schematic depiction of constructing a FIT image descriptor, according to aspects of the present invention.

FIG. 4 shows a schematic depiction of constructing a FIT descriptor, according to aspects of the present invention.

The steps of the flowchart of FIG. 3 are shown schematically in FIG. 4. The blurring of the image to construct a Gaussian pyramid (3002) and the differencing (3003) to obtain a DoG space is shown in the top left corner, proceeding to the computation of the key points on top right corner (3004). The identification of 5 primary sampling points 6002, 6001 for each key point 6001 is shown in the bottom left corner (3005). The computation of the gradient at each primary sampling point in the spatial-scale space (3006) and concatenation of the gradients from the 5 primary sampling points to arrive at the feature descriptor vector (3007) are shown in the bottom right corner.

FIG. 5A shows a flowchart of a method for constructing image descriptors, according to aspects of the present invention.

FIG. 5A and FIG. 5B may be viewed as more particular examples of stages 3004 through 3007 of FIG. 3. However, the image descriptor construction method shown in FIG. 5A and FIG. 5B is not limited to the method of FIG. 3 and may be preceded by a different process that still includes receiving input parameters and either receiving an input image or receiving the key points directly as well as constructing of a Gaussian pyramid which defines the scale. However, the steps preceding the method of FIG. 5A and FIG. 5B may or may not include the construction of the difference-of-Gaussian space that is shown in FIG. 3 and is used for locating the key points. The key points may be located in an alternative way and as long as they are within a Gaussian pyramid of varying scale, the method of FIG. 5A and FIG. 5B holds true.

The method begins at 5000. At 5001, key points are located. Key points may be located by a number of different methods one of which is shown in the exemplary flow chart of FIG. 5B. At 5002, primary sampling points are identified based on input parameters one of which is scale. At 5003, secondary sampling points are identified with respect to each primary sampling point by using some of the input parameters that again include scale. At 5004, primary image gradients are obtained at each primary sampling point. The primary image gradients are obtained based on the secondary image gradients which in turn indicate the change in image intensity or other image characteristics between each primary sampling point and its corresponding secondary sampling points. At 5005, a descriptor vector for the key point is generated by concatenating the primary image gradients for all the primary sampling points corresponding to the key point. At 5006, the method ends.

FIG. 5B shows a flowchart of a particular example of the method for constructing image descriptors shown in FIG. 5A, according to aspects of the present invention.

The method begins at 5100. At 5101, key points are located in a difference of Gaussian space and a sub-coordinate system is centered at each key point. At 5102, 5 primary sampling points are identified based on some of the input parameters one of which determines scale and the other two determine the coordinates of the primary sampling points in the sub-coordinate system having its origin at the key point. The primary sampling points are defined by vectors originating from the key point and ending at the primary sampling points at different scales within the Gaussian pyramid space. At 5103, 8 secondary sampling points are identified with respect to each primary sampling point by using some of the input parameters that again include scale in addition to a parameter which determines the radius of a circle about the primary sampling points. The 8 secondary sampling points are defined around the circle whose radius varies according to the scale of the primary sampling point which forms the center of the circle. The secondary sampling points are defined by vectors originating at the key point and ending at the secondary sampling point. At 5104, primary image gradients are obtained at each of the 5 primary sampling points. The primary image gradients include the 8 secondary image gradients of the primary sampling point as their component vectors. At 5105, a descriptor vector for the key point is generated by concatenating the primary image gradients for all of the 5 primary sampling points corresponding to the key point. At 5106, the method ends.

Figure 6:
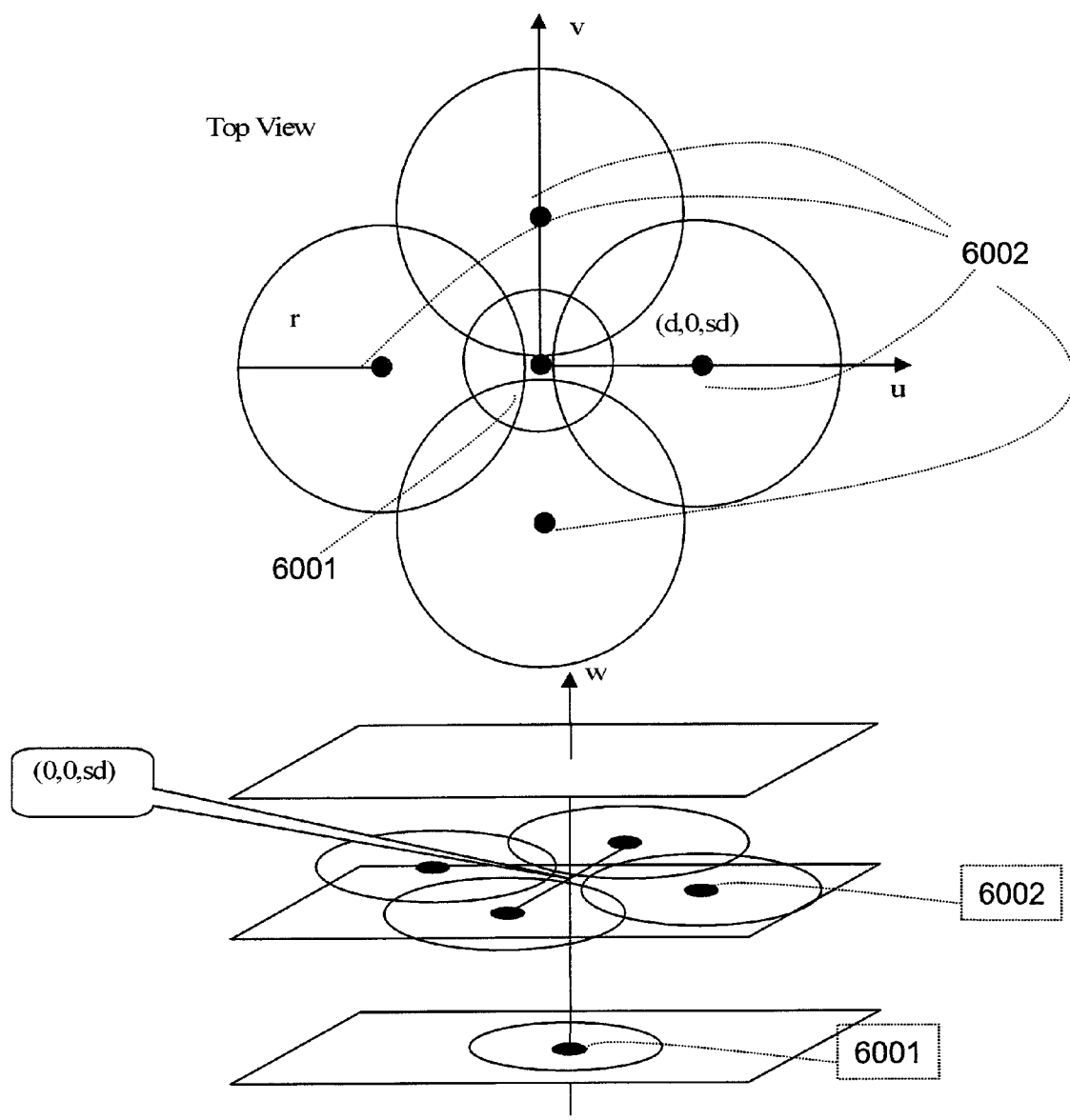
FIG. 6 shows a schematic depiction of constructing image descriptors, according to aspects of the present invention.

FIG. 6 shows a schematic depiction of constructing image descriptors, according to aspects of the present invention.

In various aspects of the present invention, the Gaussian pyramid and DoG pyramid are considered in a continuous 3D spatial-scale space. In the coordinate system of the continuous 3D spatial-scale space, a space plane is defined by two perpendicular axes u and v. A third dimension, being the scale dimension, is defined by a third axis w perpendicular to the plane formed by the spatial axes u and v. The scale dimension refers to the scale of the Gaussian filter. Therefore, the spatial-scale space is formed by a space plane and the scale vector that adds the third dimension. The image is formed in the two-dimensional space plane. The gradual blurring of the image yields the third dimension, the scale dimension. Each key point 6001 becomes the origin of a local sub-coordinate system from which the u, v and w axes originate.

In this spatial-scale coordinate system, any point in an image can be described with I(x, y, s) where (x, y) corresponds to a location in spatial domain (image domain), s corresponds to a Gaussian filter scale in the scale domain. The spatial domain is the domain where the image is formed. Therefore, I corresponds to the image at the location (x, y) and blurred by the Gaussian filter of scale s. The local sub-coordinate system originating at a key point is defined for describing the descriptor details in the spatial-scale space. In this sub-coordinate system, the key point 6001 itself has coordinates (0, 0, 0), and the u direction will align with the key point orientation in the spatial domain. Key point orientation is decided by the dominant gradient histogram bin which is determined in a manner similar to SIFT. The v direction in the spatial domain is obtained by rotating the u axis 90 degrees in counter clockwise direction in the spatial domain centered at the origin. The w axis corresponding to scale change is perpendicular to the spatial domain and points to the increasing direction of the scale. These directions are exemplary and selected for ease of computation. In addition to the sub-coordinate system, scale parameters d, sd, and r are used for both defining the primary sampling points 6002 and controlling information collection around each primary sampling point.

In the exemplary aspect that is shown, for each key point 6001, the descriptor information is collected at 5 primary sampling points 6001, 6002 that may or may not include the key point itself. FIG. 6 illustrates the primary sampling point distribution in a sub-coordinate system where the key point 6001 is the origin. We define these primary sampling points with 3D vectors $O_i$ from the origin (0, 0, 0) of the sub-coordinate system to sampling point locations, where i=0, 1, 2, 3, 4. Therefore, the primary sampling points, corresponding to the key point which is by definition located at the origin (0, 0, 0), are defined with the following vectors:

$$O_0 = [\,0 \quad 0 \quad 0\,]$$
$$O_1 = [\,d \quad 0 \quad sd\,]$$
$$O_2 = [\,0 \quad d \quad sd\,]$$
$$O_3 = [\,-d \quad 0 \quad sd\,]$$
$$O_4 = [\,0 \quad -d \quad sd\,]$$

In each primary sampling point vector $O_i$ the first two coordinates show the u and v coordinates of the ending point of the vector and the third coordinate shows the w coordinate which corresponds to the scale. Each primary sampling point vector $O_i$ originates at the key point.

In other embodiments and aspects of the present invention, a different number of primary sampling points may be used.

In the exemplary aspect that is shown in the Figures, the primary sampling points include the origin or the key point 6001 itself, as well. However, the primary sampling points may be selected such that they do not include the key point. As the coordinates of the primary sampling points indicate, these points are selected at different scales. In the exemplary aspect shown, the primary sampling points are selected at two different scales, 0 and sd. However, the primary sampling points may be selected each at a different scale or with any other combination of different scales. Even if the primary sampling points are selected to all locate at a same scale, the aspects of the present invention are distinguished from SIFT by the method of selection of both the primary and the secondary sampling points.

In the exemplary aspect shown, at each of the 5 primary sampling points, 8 gradient values are computed. First, 8 secondary sampling points, shown by vectors $O_{ij}$, are defined around each primary sampling point, shown by vector $O_i$, according to the following equation:

$$O_{ij} - O_{i,} = [r_i\cos(2\pi j/8) \quad r_i\sin(2\pi j/8) \quad 0] \quad i=0$$

$$\text{for } j = 1, \ldots, 7$$

$$O_{ij} - O_{i,} = [r_i\cos(2\pi j/8) \quad r_i\sin(2\pi j/8) \quad sd] \quad i \neq 0$$

$$\text{for } j = 1, \ldots, 7$$

According to the above equation, these 8 secondary sampling points are distributed uniformly around the circles that are centered at the primary sampling points as shown in FIG. 6. The radius of the circle depends on the scale of the plane where the primary sampling point is located and therefore the radius increases as the scale increases. As the radius increases the secondary sampling points are collected further apart from the primary sampling point and from each other indicating that at higher scales, there is no need to sample densely. Based on these 8 secondary sampling points $O_{ij}$, and their corresponding central primary sampling point $O_i$, the primary image gradient vector $V_i$ for each primary sampling point is calculated with the following equations:

$$I_{ij}=\max(I(O_i)-I(O_{ij})),0) \text{ in this equation } I_{ij} \text{ is a scalar.}$$

$$V_{ij}=I_{ij}/[SQRT(\text{sum over } j=0 \text{ to } j=7 \text{ of } I_{ij}^2)] \text{ in this equation } V_{ij} \text{ is a scalar.}$$

$$V_i=[V_{i0}(O_i-O_{i0})/[\text{magnitude of } (O_i-O_{i0})], V_{i1}(O_i-O_{i1})/[\text{magnitude of } (O_i-O_{i1})], V_{i2}(O_i-O_{i2})/[\text{magnitude of } (O_i-O_{i2})], V_{i3}(O_i-O_{i3})/[\text{magnitude of } (O_i-O_{i3})] V_{i4}(O_i-O_{i4})/[\text{magnitude of } (O_i-O_{i4})], V_{i5}(O_i-O_{i5})/[\text{magnitude of } (O_i-O_{i5})], V_{i6}(O_i-O_{i6})/[\text{magnitude of } (O_i-O_{i6})], V_{i7}(O_i-O_{i7})/[\text{magnitude of } (O_i-O_{i7})]].$$

In the above equation $V_i$ is a vector having scalar components $[V_{i0}, V_{i1}, V_{i2}, V_{i3}, V_{i4}, V_{i5}, V_{i6}, V_{i7}]$ in directions $[O_i-O_{i0}, O_i-O_{i1}, O_i-O_{i2}, O_i-O_{i3}, O_i-O_{i4}, O_i-O_{i5}, O_i-O_{i6}, O_i-O_{i7}]$. The direction vectors are normalized by division by their magnitude.

The scalar value I corresponds to the image intensity level at a particular location. The scalar value $I_{ij}$ provides a difference between the image intensity $I(O_i)$ of each primary sampling point and the image intensity $I(O_{ij})$ of each of the 8 secondary sampling points selected at equal intervals around a circle centered at that particular primary sampling point. If this difference in image intensity is smaller than zero and yields a negative value; then, it is set to zero. Therefore, the component values $V_{ij}$ that result do not have any negative components. There are 8 secondary sampling points, for $j=0,\ldots,7$, around each circle and for each of the 5 primary sampling points, for $i=0,\ldots,4$. Therefore, there would be 8 component vectors $I_{i0} O_{i0}/[\text{magnitude of } O_{i0}], \ldots I_{i7} O_{i7}/[\text{magnitude of } O_{i7}]$ resulting in one component vector $V_i$ for each of the 5 primary sampling points. Each of the component vectors $V_i$ has eight components itself. The component vectors corresponding to $I_{i0},\ldots,I_{i7}$ are called secondary image gradient vectors and the component vectors $V_i$ are called the primary image gradient vectors.

By concatenating the 5 primary image gradient vectors $V_i$ calculated at the 5 primary sampling points, the descriptor vector V is obtained for a key point by the following equation:

$$V=[V_0,V_1,V_2,V_3,V_4]$$

In the above equations, parameters d, sd, and r all depend on the key point scale of a sub-coordinate system. The key point scale is denoted by a scale s which may be an integer or a non-integer multiple of a base standard deviation, or scale, $s_0$ or may be determined in a different manner. Irrespective of the method of determination, the scale s may varies with the location of the key point. Three constant values dr, sdr, and rr are provided as inputs to the system. The values d, sd and r, that determine the coordinates of the five primary sampling points are obtained by using the three constant values, dr, sdr, and rr together with the scale s. The radii of the circles around the primary sampling points, where the secondary sampling points are located, are also obtained from the same constant input values. The coordinates of the both the primary and secondary sampling points are thus obtained using the following equations:

$$d=dr \cdot s$$

$$sd=sdr \cdot s$$

$$r_i=r_0(1+sdr) \text{ where } r_0=rr \cdot s$$

The above equations all include the scale factor, s, and are all scale dependent such that the coordinates change as a function of scale. For example, the scale of the plane where each primary sampling point is located may be different from the scale of the plane where another primary sampling point is located. Therefore, as the primary sampling point changes, for example from i=0 to i=1, the scale s changes and so do all the coordinates d, sd and the radius $r_i$. Different equations may be used for obtaining the coordinates of the primary and secondary sampling points as long the scale dependency is complied with.

In some situations, the scale s of each gradient vector may be located between the computed image planes in the Gaussian pyramid. In these situations, the gradient values may be first computed on the two closest image planes to a primary sampling point. After that, Lagrange interpolation is used to calculate each of the gradient vectors at the scale of the primary sampling point.

Figure 2:
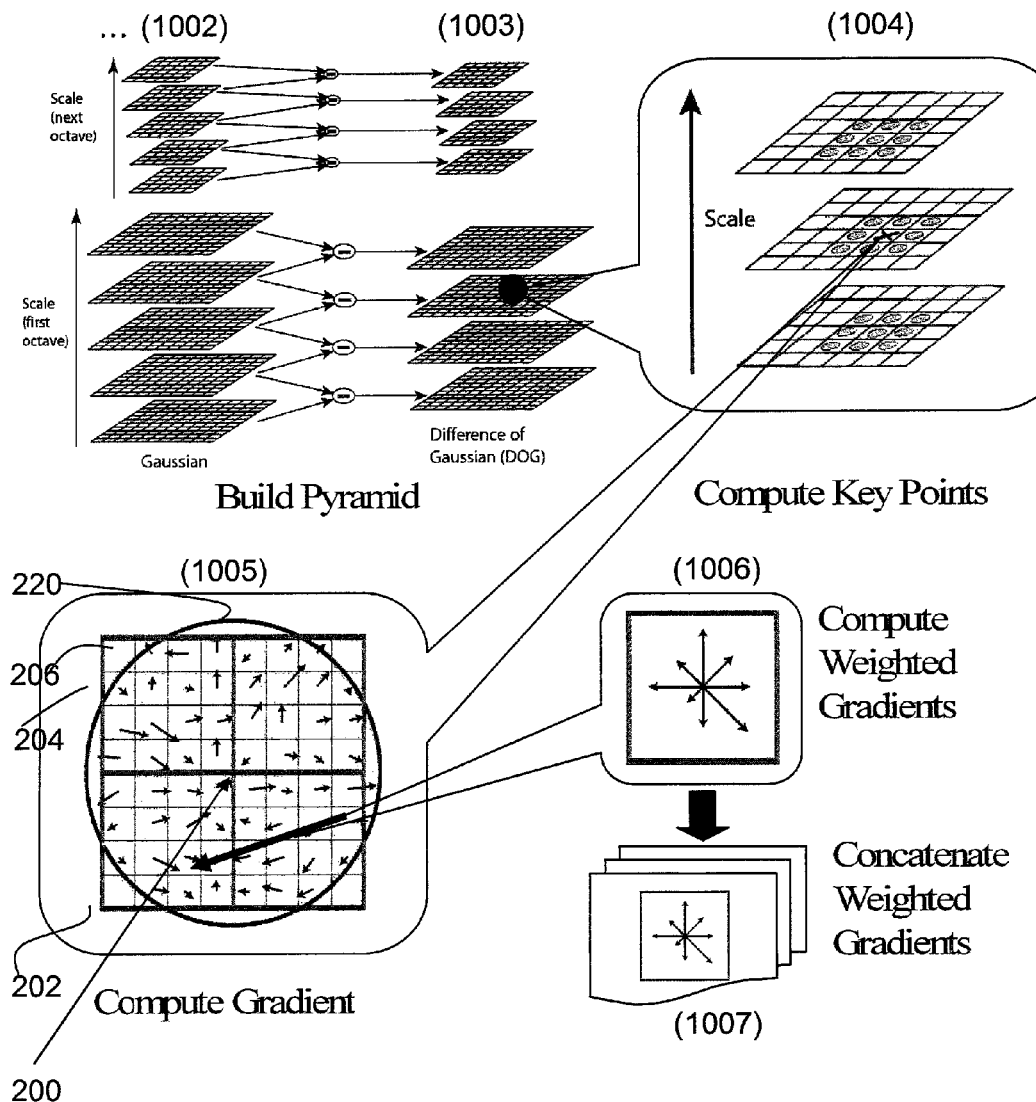
FIG. 2 shows a schematic depiction of constructing a SIFT descriptor.

In one exemplary aspect of the present invention, the standard deviation of the first Gaussian filter that is used for construction of the Gaussian pyramid is input to the system as a predetermined value. This standard deviation parameter is denoted with $s_0$. The variable scale s, may then be defined as an integer or non-integer multiple of $s_0$ such that $s=m_i s_0$. In other examples the variation of s is determined in a manner to fit 3 planes between the first and last planes of each octave as shown in FIG. 2 and FIG. 4.

On exemplary evaluation of the aspects of the present invention is provided below.

In the exemplary experimental evaluation, the parameters $s_0$, dr, sdr and rr were determined experimentally, and provided as inputs to the method and system of the present invention. The parameter $s_0$ is the base standard deviation used to obtain the Gaussian blurred images with different degrees of blurring.

The method and system of the present invention were applied to 1000 pages from the ICME06 proceedings. Each page was converted to a 306 by 396 image and fed into the system as a training image to extract key points and feature vectors. The image of each page was randomly enlarged or reduced, by a factor between 0.18 and 2, and randomly rotated, by an angle between 0° to 360° degrees, to obtain 3 test images corresponding to each input page and to generate 3000 test images. Testing the system with different sizes and rotations of the same image shows whether the system is invariant to scaling and rotation or not. These 3000 test images were provided to the system. The resulting output had a page recognition rate of 99.9% for these input images. In contrast, the SIFT descriptor provided a page recognition rate of 99.93%, using the same search algorithm, the same training images, and the same testing images. The viability of the method and system of the present invention for larger datasets was tested by using 2188 pages from the ICME06 proceedings. The recognition rate provided by the method and system of the present invention for this larger dataset is 99.6%. Based on these experiments, the feature set obtained by application of the method and system of the present invention is comparable to and even superior to the feature set obtained by SIFT in recognition rate.

At the same time, the search speed provided by the aspects of the present invention exceeds the speed of the SIFT system such that the search time required by the aspects of the invention is approximately one order of magnitude smaller than the time required by the SIFT system. Search times based on the feature set of the aspects of the present invention and the SIFT feature set were recorded and compared. In this comparison, the search was based on the Approximate Nearest Neighbor (ANN) algorithm, the training data set has 1000 images, and the testing data had 3000 images as described in the previous paragraph. The experiment yielded an average image search time of 24 ms with the descriptor vector of the aspects of the present invention, while the average search time with the SIFT descriptor was 220 ms. Therefore, the experiment indicated that, when compared to SIFT, the aspects of the present invention provide a comparable recognition rate at superior speeds.

As the above description indicates, the aspects of the present invention utilize a set of 3D vectors originating from each key point and ending at locations corresponding to different scales. The ending points of these 3D vectors define primary sampling points for each key point in the Gaussian pyramid space. In contrast to the aspects of the present invention, SIFT uses sampling rectangles, or samples, instead of sampling points and all sampling rectangles of SIFT are on the same scale as the selected key point in SIFT.

Further, the aspects of the present invention compute scale dependent gradients around each primary sampling point and concatenate gradients from all primary sampling points of a key point to form a feature descriptor vector. In one exemplary implementation, when 5 primary sampling points are used for sampling each key point and 8 secondary sampling points are determined around circles centered at each of the 5 primary sampling points, a 40 dimensional feature descriptor vector is obtained for each key point. In contrast to the aspects of the present invention, SIFT computes gradients only between adjacent pixels at a same scale and averages the gradients over a large area which is related to a single scale level. In order to achieve the comparable levels of accuracy in image recognition, SIFT has to use a 128-dimensional feature descriptor vector.

Therefore, the aspects of the present invention enable one to: speed up invariant image feature vector construction and reduce time span for searching corresponding image features; save memory space and disk space for indexing a large amount of image data; and save computation cost including hardware, software, and energy costs.

Figure 7:
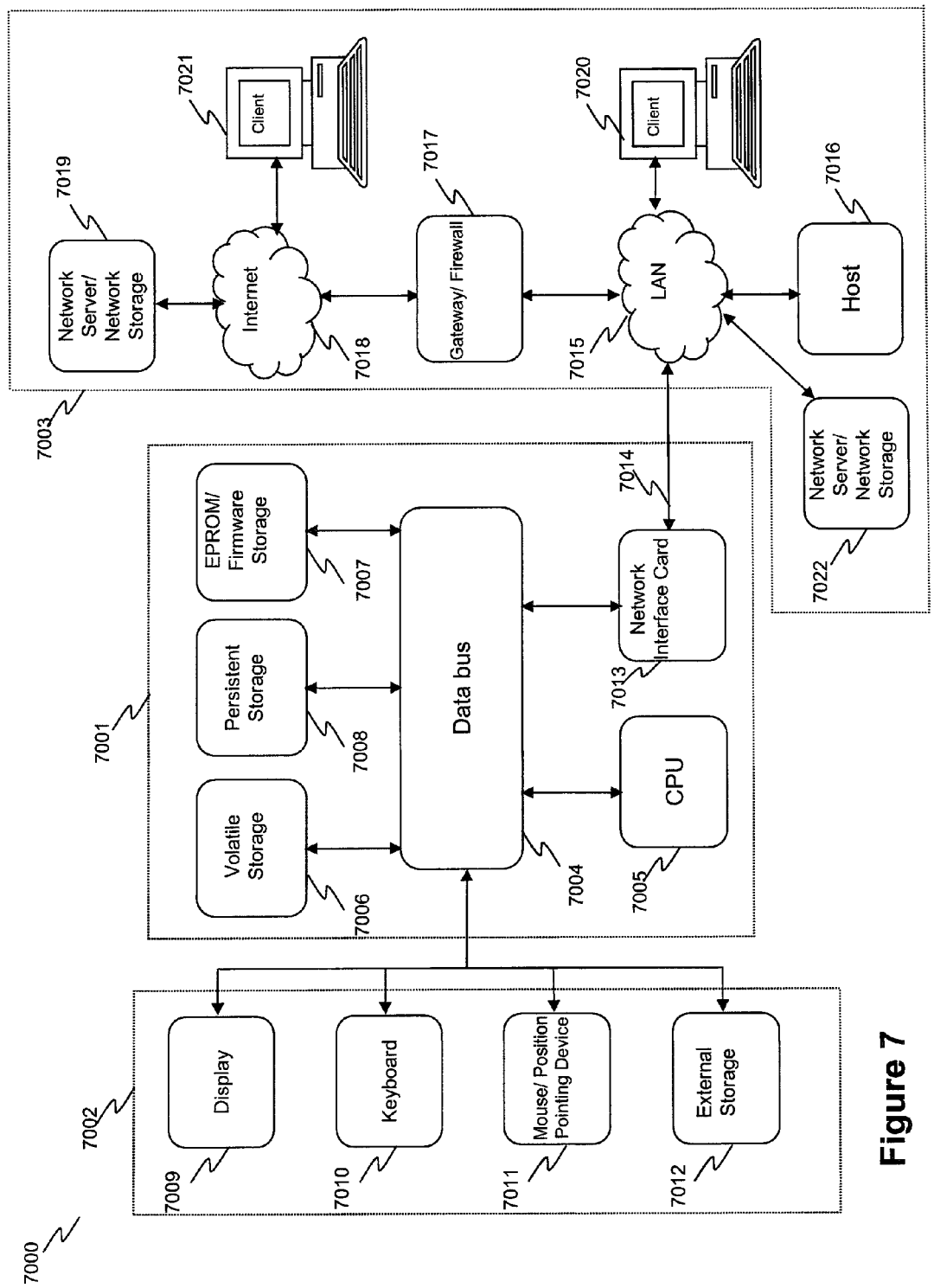
FIG. 7 illustrates an exemplary embodiment of a computer platform upon which the inventive system may be implemented.

FIG. 7 is a block diagram that illustrates an embodiment of a computer/server system 7000 upon which an embodiment of the inventive methodology may be implemented.

The system 7000 includes a computer/server platform 7001, peripheral devices 7002 and network resources 7003.

The computer platform 7001 may include a data bus 7004 or other communication mechanism for communicating information across and among various parts of the computer platform 7001, and a processor 7005 coupled with bus 7001 for processing information and performing other computational and control tasks. Computer platform 7001 also includes a volatile storage 7006, such as a random access memory (RAM) or other dynamic storage device, coupled to bus 7004 for storing various information as well as instructions to be executed by processor 7005. The volatile storage 7006 also may be used for storing temporary variables or other intermediate information during execution of instructions by processor 7005. Computer platform 7001 may further include a read only memory (ROM or EPROM) 7007 or other static storage device coupled to bus 7004 for storing static information and instructions for processor 7005, such as basic input-output system (BIOS), as well as various system configuration parameters. A persistent storage device 7008, such as a magnetic disk, optical disk, or solid-state flash memory device is provided and coupled to bus 7001 for storing information and instructions.

Computer platform 7001 may be coupled via bus 7004 to a display 7009, such as a cathode ray tube (CRT), plasma display, or a liquid crystal display (LCD), for displaying information to a system administrator or user of the computer platform 7001. An input device 7010, including alphanumeric and other keys, is coupled to bus 7001 for communicating information and command selections to processor 7005. Another type of user input device is cursor control device 7011, such as a mouse, a trackball, or cursor direction keys for communicating direction information and command selections to processor 7004 and for controlling cursor movement on display 7009. This input device typically has two degrees of freedom in two axes, a first axis (e.g., x) and a second axis (e.g., y), that allows the device to specify positions in a plane.

An external storage device 7012 may be connected to the computer platform 7001 via bus 7004 to provide an extra or removable storage capacity for the computer platform 7001. In an embodiment of the computer system 7000, the external removable storage device 7012 may be used to facilitate exchange of data with other computer systems.

The invention is related to the use of computer system 7000 for implementing the techniques described herein. In an embodiment, the inventive system may reside on a machine such as computer platform 7001. According to one embodiment of the invention, the techniques described herein are performed by computer system 7000 in response to processor 7005 executing one or more sequences of one or more instructions contained in the volatile memory 7006. Such instructions may be read into volatile memory 7006 from another computer-readable medium, such as persistent storage device 7008. Execution of the sequences of instructions contained in the volatile memory 7006 causes processor 7005 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 7005 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 7008. Volatile media includes dynamic memory, such as volatile storage 7006. Transmission media includes coaxial cables, copper wire and fiber optics, including the wires that comprise data bus 7004.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 705 for execution. For example, the instructions may initially be carried on a magnetic disk from a remote computer. Alternatively, a remote computer can load the instructions into its dynamic memory and send the instructions over a telephone line using a modem. A modem local to computer system 7000 can receive the data on the telephone line and use an infra-red transmitter to convert the data to an infra-red signal. An infra-red detector can receive the data carried in the infra-red signal and appropriate circuitry can place the data on the data bus 7004. The bus 7004 carries the data to the volatile storage 7006, from which processor 7005 retrieves and executes the instructions. The instructions received by the volatile memory 7006 may optionally be stored on persistent storage device 7008 either before or after execution by processor 7005. The instructions may also be downloaded into the computer platform 7001 via Internet using a variety of network data communication protocols well known in the art.

The computer platform 7001 also includes a communication interface, such as network interface card 7013 coupled to the data bus 7004. Communication interface 7013 provides a two-way data communication coupling to a network link 7014 that is connected to a local area network (LAN) 7015. For example, communication interface 7013 may be an integrated services digital network (ISDN) card or a modem to provide a data communication connection to a corresponding type of telephone line. As another example, communication interface 7013 may be a local area network interface card (LAN NIC) to provide a data communication connection to a compatible LAN. Wireless links, such as well-known 7002.11a, 7002.11b, 7002.11g and Bluetooth may also be used for network implementation. In any such implementation, communication interface 7013 sends and receives electrical, electromagnetic or optical signals that carry digital data streams representing various types of information.

Network link 7013 typically provides data communication through one or more networks to other network resources. For example, network link 7014 may provide a connection through LAN 7015 to a host computer 7016, or a network storage/server 7017. Additionally or alternatively, the network link 7013 may connect through gateway/firewall 7017 to the wide-area or global network 7018, such as an Internet. Thus, the computer platform 7001 can access network resources located anywhere on the Internet 7018, such as a remote network storage/server 7019. On the other hand, the computer platform 7001 may also be accessed by clients located anywhere on the LAN 7015 and/or the Internet 7018. The network clients 7020 and 7021 may themselves be implemented based on the computer platform similar to the platform 7001.

The LAN 7015 and the Internet 7018 both use electrical, electromagnetic or optical signals that carry digital data streams. The signals through the various networks and the signals on network link 7014 and through communication interface 7013, which carry the digital data to and from computer platform 7001, are exemplary forms of carrier waves transporting the information.

Computer platform 7001 can send messages and receive data, including program code, through the variety of network(s) including Internet 7018 and LAN 7015, network link 7014 and communication interface 7013. In the Internet example, when the system 7001 acts as a network server, it might transmit a requested code or data for an application program running on client(s) 7020 and/or 7021 through Internet 7018, gateway/firewall 7017, LAN 7015 and communication interface 7013. Similarly, it may receive code from other network resources.

The received code may be executed by processor 7005 as it is received, and/or stored in persistent or volatile storage devices 7008 and 7006, respectively, or other non-volatile storage for later execution. In this manner, computer system 7001 may obtain application code in the form of a carrier wave.

Figure 8:
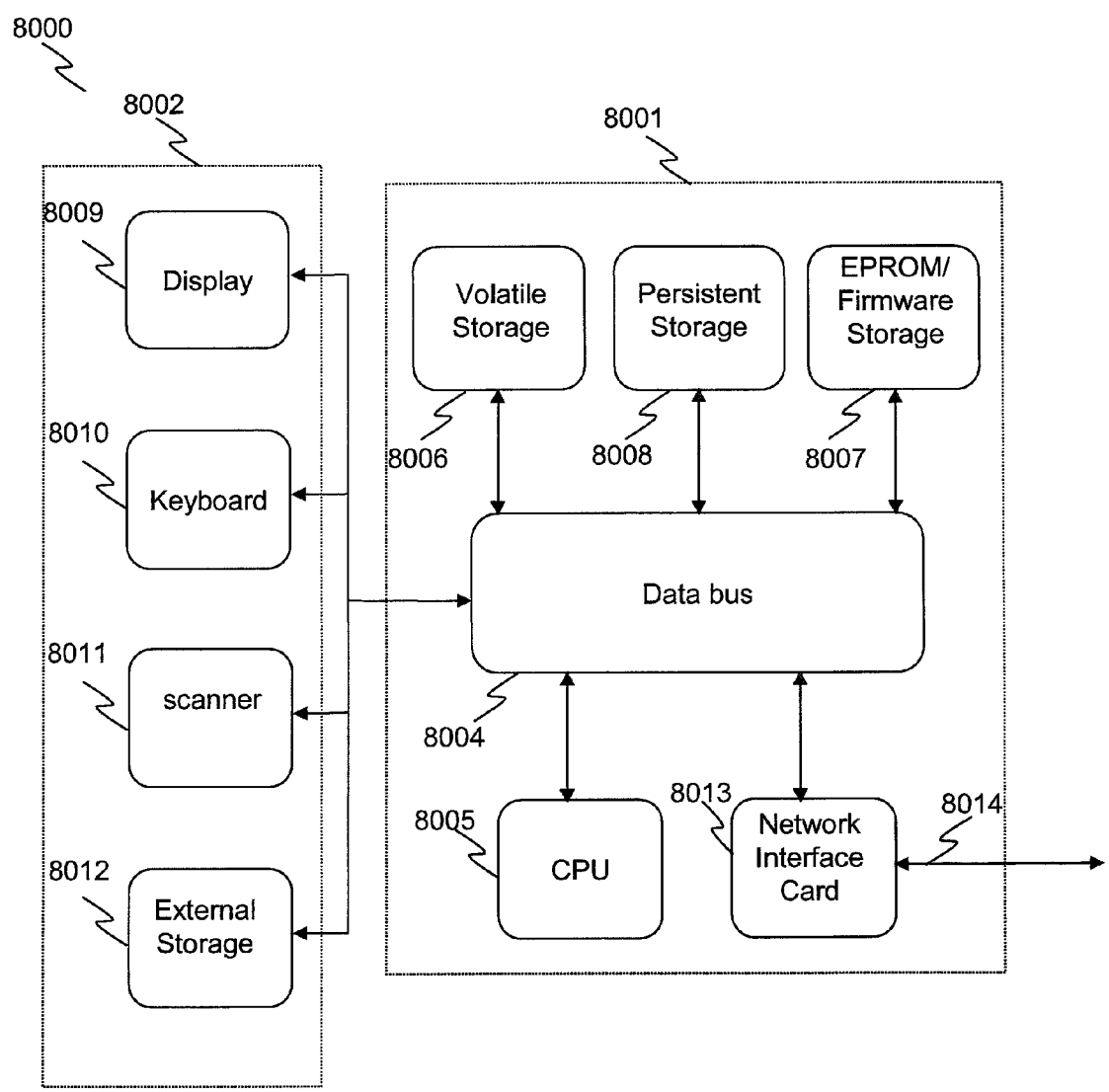
FIG. 8 illustrates how some aspects of the present invention relate to the computer platform of FIG. 7.

FIG. 8 illustrates how some aspects of the present invention relate to the computer platform of FIG. 7.

The process described above with respect to some aspects of the present invention may be implemented on a computer platform system 8000 shown in FIG. 8. The input image may be stored in an external storage device 8012 or received from a network through a network interface cared 8014 or through a scanner 8012. The input parameters may be provided through a keyboard 8010 to the system. The input image and intermediate outputs may be displayed to a user on a display 8009. A CPU 8005, a volatile storage 8006 and a persistent storage 8008 may communicate together through a databus 8004 in order to perform the various steps of processing the input image and the input parameters in order to obtain an image descriptor vector that is displayed to the user on the display 8009.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct a specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the inventive system. It is intended that the specification and examples be considered as exemplary only, with a true scope and spirit of the invention being indicated by the following claims and their equivalents.

What is claimed is:

1. A method for generating a feature descriptor vector for image identification, the method being implemented in a computing system having components including an input and output interface, a storage medium, one or more processors, and a link providing communication between the components, the method comprising:

receiving an input image at the input and output interface;
constructing a Gaussian pyramid space of the input image by applying Gaussian-blur filters to the input image and generating Gaussian-blurred images, the Gaussian-blur filters each having a different scale of blurring, the scales being based on input parameters;
locating key points in the Gaussian pyramid space;
identifying primary sampling points for each of the key points in the Gaussian pyramid space, the primary sampling points being defined with three dimensional relative positions from the key point;
calculating primary image gradients corresponding to the primary sampling points, the primary image gradients being vectors indicating a change in image in a vicinity of the primary sampling points; and
generating a feature descriptor vector for the input image by concatenating the primary image gradients.

2. The method of claim 1, wherein the locating key points in the Gaussian pyramid space comprises:
constructing a difference-of-Gaussian-space by obtaining differences between consecutive ones of the Gaussian-blurred images; and
locating the key points as local maxima or local minima of planes in the difference-of-Gaussian space.

3. The method of claim 1,
wherein secondary sampling points corresponding to each of the primary sampling points are used to obtain the primary image gradients, and
wherein a location of the secondary sampling points with respect to the corresponding primary sampling point is defined based on the scale of the primary sampling point.

4. The method of claim 1, wherein the Gaussian-blurred images are generated by applying a series of Gaussian-blur filters.

5. The method of claim 1, wherein the three-dimensional vectors identifying the primary sampling points for each of the key points are predetermined.

6. The method of claim 1,
wherein the input parameters include scale factor(s) and sampling parameters, wherein the sampling parameters include primary sampling parameters and a secondary sampling parameter.

7. The method of claim 6,
wherein the three-dimensional vectors of each key point are defined in a sub-coordinate system having the key point as origin.

8. The method of claim 7,
wherein the primary sampling parameters include a first parameter, dr, and a second parameter, sdr, and
wherein coordinates of the primary sampling points are determined from the primary sampling parameters and the scale of the key point, s, according to:

$$d = dr \cdot s,$$

$$sd = sdr \cdot s.$$

9. The method of claim 8, wherein the index i varies from 0 to 4 indicating five primary sampling points:
a first primary sampling point having coordinates (0, 0, 0) corresponding the key point,
a second primary sampling point having coordinates (d, 0, sd),
a third primary sampling point having coordinates (0, d, sd),
a fourth primary sampling point having coordinates (−d, 0, sd), and
a fifth primary sampling point having coordinates (0, −d, sd).

10. The method of claim 8,
wherein the secondary sampling parameter is a third parameter, rr,
wherein the secondary sampling points are determined based on the third parameter, rr, the second parameter, sdr, of the primary sampling parameters, and the scale of the key point, s, of the corresponding primary sampling point, according to:

$$r_0 = rr \cdot s,$$

$$r = r_0(1 + sdr), \text{ and}$$

wherein the secondary sampling points are located at equidistance intervals on a perimeter of a circle, having a radius r.

11. The method of claim 1,
wherein the primary image gradients include secondary image gradients at each of the secondary sampling points,
wherein the secondary image gradients indicate a change in image between each of the primary sampling points and the secondary sampling points corresponding to the primary sampling point according to:

$$I_{ij} = \max(I(O_i) - I(O_{ij}), 0)$$

index i indicates the primary sampling point, i=0 . . . n, n+1 being a number of the primary sampling points,
index j indicates the secondary sampling point, j=0 . . . m, m+1 being a number of the secondary sampling points,
$O_i$ indicates the three-dimensional vector defining the primary sampling point i,
$O_{ij}$ indicates the three-dimensional vector defining the secondary sampling point i,j,
$I(O_i)$ indicates an image intensity level at the primary sampling point i,
$I(O_{ij})$ indicates an image intensity level at the secondary sampling point ij,
$I_{ij}$ indicates a non-negative scalar corresponding to a change in image intensity between the primary sampling point i and the secondary sampling point ij that corresponds to the primary sampling point i,
wherein the primary image gradients at each of the primary sampling points i are obtained according to:

$$V_{ij} = I_{ij} / [SQRT(\text{sum over } j=0 \text{ to } j=m \text{ of } (I_{ij})^2)]$$

$$V_i = [V_{i0}(O_i - O_{i0}) / [\text{magnitude of } (O_i - O_{i0})], \ldots, V_{i7}(O_i - O_{im}) / [\text{magnitude of } (O_i - O_{im})]]$$

$V_{ij}$ provides a scalar indicating the secondary image gradient component magnitude at the secondary point i,j,
$V_i$ provides the primary image gradient vector at the primary sampling point i, each $V_i$ having a dimension equal to the total number of j, and
wherein the feature descriptor vector of each key point is obtained from the concatenation of the primary image gradients according to:

$$V = [V_o, \ldots V_i, \ldots, V_n]$$

where n is a number of primary sampling points identified for the key point.

12. The method of claim 1, further comprising receiving the input parameters at the input and output interface.

13. A computer system for generating a feature descriptor vector for image identification comprising:
an input and output interface for receiving an input image; and one or more processors for constructing a Gaussian pyramid space of the input image by applying Gaussian-blur filters to the input image and generating Gaussian-blurred images, the Gaussian-blur filters each having a different scale of blurring, the scales being based on input parameters, wherein the one or more processors locate key points in the Gaussian pyramid space, wherein the one or more processors identify primary sampling points for each of the key points in the Gaussian pyramid space, the primary sampling points being defined with three dimensional relative positions from the key point, wherein the one or more processors calculate primary image gradients corresponding to the primary sampling points, the primary image gradients being vectors indicating a change in image in a vicinity of the primary sampling points, wherein the one or more processors generate a feature descriptor vector for the input image by concatenating the primary image gradients, and wherein the input and output interface provides the feature descriptor vector to a user through the input and output interface.

14. The system of claim 13, wherein the locating key points in the Gaussian pyramid space comprises:

constructing a difference-of-Gaussian-space by obtaining differences between consecutive ones of the Gaussian-blurred images; and locating the key points as local maxima or local minima of planes in the difference-of-Gaussian space.

15. The system of claim 13, wherein secondary sampling points corresponding to each of the primary sampling points are used to obtain the primary image gradients, and wherein a location of the secondary sampling points with respect to the corresponding primary sampling point is based on the scale of the primary sampling point.

16. The system of claim 13, wherein the Gaussian-blurred images are generated by applying a series of Gaussian-blur filters.

17. The system of claim 13, wherein the three-dimensional vectors identifying the primary sampling points for each of the key points are predetermined.

18. The system of claim 13, wherein the input parameters include scale factors, s, and sampling parameters, dr, sdr, rr;

wherein indices i determine each of the primary sampling points, and wherein the sampling parameters include primary sampling parameters and a secondary sampling parameter.

19. The system of claim 18, wherein the three-dimensional vectors of each key point are defined in a sub-coordinate system having the key point as origin (0, 0, 0).

20. The system of claim 19, wherein the primary sampling parameters include a first parameter, dr, and a second parameter, sdr, and wherein coordinates of the primary sampling points are determined from the primary sampling parameters and the scale factor according to:

$d = dr \cdot s$ $sd = sdr \cdot s$.

21. The system of claim 20, wherein the index i varies from 0 to 4 indicating five primary sampling points:

a first primary sampling point having coordinates (0, 0, 0) corresponding the key point, a second primary sampling point having coordinates (d, 0, sd), a third primary sampling point having coordinates (0, d, sd), a fourth primary sampling point having coordinates (−d, 0, sd), and a fifth primary sampling point having coordinates (0, −d, sd).

22. The system of claim 20, wherein the secondary sampling parameter is a third parameter, rr, wherein the secondary sampling points are determined based on the third parameter, rr, the second parameter, sdr, of the primary sampling parameters, and the scale, s, of the corresponding primary sampling point, according to:

$r_0 = rr \cdot s,$ $r = r_0(1 + sdr),$ and wherein the secondary sampling points are located at equidistance intervals on a perimeter of a circle, having a radius r.

23. The system of claim 13, wherein the primary image gradients include secondary image gradients at each of the secondary sampling points, wherein the secondary image gradients indicate a change in image between each of the primary sampling points and the secondary sampling points corresponding to the primary sampling point according to:

$I_{ij} = \max(I(O_i) - I(O_{ij}), 0)$ index i indicates the primary sampling point, i=0 ... n, n+1 being a number of the primary sampling points, index j indicates the secondary sampling point, j=0 ... m, m+1 being a number of the secondary sampling points, $O_i$ indicates the three-dimensional vector defining the primary sampling point i, $O_{ij}$ indicates the three-dimensional vector defining the secondary sampling point i,j, $I(O_i)$ indicates an image intensity level at the primary sampling point i, $I(O_{ij})$ indicates an image intensity level at the secondary sampling point ij, $I_{ij}$ indicates a non-negative scalar corresponding to a change in image intensity between the primary sampling point i and the secondary sampling point ij that corresponds to the primary sampling point i, wherein the primary image gradients at each of the primary sampling points i are obtained according to:

$V_{ij} = I_{ij} / [SQRT(\text{sum over } j=0 \text{ to } j=m \text{ of } (I_{ij})^2)]$ $V_i = [V_{i0}(O_i - O_{i0}) / [\text{magnitude of } (O_i - O_{i0}], \ldots, V_{i7}(O_i - O_{im}) / [\text{magnitude of } (O_i - O_{im})]]$ $V_{ij}$ provides a scalar indicating the secondary image gradient component magnitude at the secondary point i,j, Vi provides the primary image gradient vector at the primary sampling point i, each $V_i$ having a dimension equal to the total number of j, and wherein the feature descriptor vector of each key point is obtained from the concatenation of the primary image gradients according to:

$V = [V_0, \ldots V_1 \ldots, V_n]$ where n is a number of primary sampling points identified for the key point.

24. A non-transitory computer readable medium embodying a set of instructions, which, when executed by one or more processors cause the one or more processors of a computer system to perform a method for generating a feature descriptor vector for image identification, the computer system having components including an input and output interface, a storage medium, one or more processors, and a link providing communication between the components, the method comprising:

receiving an input image at the input and output interface;
constructing a Gaussian pyramid space of the input image by applying Gaussian-blur filters to the input image and generating Gaussian-blurred images, the Gaussian-blur filters each having a different scale of blurring, the scales being based on input parameters;
locating key points in the Gaussian pyramid space;
identifying primary sampling points for each of the key points in the Gaussian pyramid space, the primary sampling points being defined with three dimensional relative positions from the key point;
calculating primary image gradients corresponding to the primary sampling points, the primary image gradients being vectors indicating a change in image in a vicinity of the primary sampling points; and
generating a feature descriptor vector for the input image by concatenating the primary image gradients.

* * * * *